(12) United States Patent
Flynn

(10) Patent No.: US 7,748,238 B2
(45) Date of Patent: Jul. 6, 2010

(54) NECK RING COOLING

(75) Inventor: Robin L Flynn, Waterville, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 192 days.

(21) Appl. No.: 11/974,449

(22) Filed: Oct. 12, 2007

(65) Prior Publication Data

US 2008/0034610 A1 Feb. 14, 2008

Related U.S. Application Data

(62) Division of application No. 10/892,677, filed on Jul. 15, 2004, now Pat. No. 7,296,442.

(51) Int. Cl.
C03B 15/00 (2006.01)
C03B 11/00 (2006.01)
C03B 19/00 (2006.01)
C03B 13/00 (2006.01)

(52) U.S. Cl. ............................. 65/356; 65/355; 65/243

(58) Field of Classification Search ........... 65/355–356, 65/265, 267, 319, 348–351
See application file for complete search history.

(56) References Cited

U.S. PATENT DOCUMENTS

| 3,653,870 | A | 4/1972 | Foster et al. |
|---|---|---|---|
| 4,361,434 | A | 11/1982 | Schneider |
| 4,512,792 | A | 4/1985 | Irwin et al. |
| 4,623,374 | A | 11/1986 | Doud et al. |
| 4,629,488 | A | 12/1986 | Doud et al. |
| 4,655,813 | A | 4/1987 | Nebelung et al. |
| 4,659,357 | A | 4/1987 | Doud |
| 4,701,202 | A | 10/1987 | Foster |
| 4,701,203 | A | 10/1987 | Schneider |
| 4,750,929 | A | 6/1988 | Bolin |
| 4,842,637 | A | 6/1989 | Bolin et al. |
| 4,909,823 | A | 3/1990 | Bolin |
| 4,983,203 | A | 1/1991 | Erb et al. |
| 5,358,542 | A | 10/1994 | Johnson et al. |
| 5,516,352 | A * | 5/1996 | Bogert et al. .................. 65/265 |
| 5,900,035 | A | 5/1999 | Hkoenig et al. |

FOREIGN PATENT DOCUMENTS

| DE | 19838698 | 3/2000 |
|---|---|---|
| EP | 0187325 A2 | 12/1985 |
| EP | 0297021 | 12/1988 |
| GB | 1122899 | 8/1968 |
| JP | 406064931 A | 3/1994 |

* cited by examiner

*Primary Examiner*—Steven P Griffin
*Assistant Examiner*—Jodi Cohen

(57) ABSTRACT

A system for directing cooling air onto a neck ring in a glassware molding machine that includes at least one air plenum stationarily disposed at a blank mold station and having an internal cavity for receiving cooling air flowing laterally inwardly toward the axis and at least one outlet opening adjacent to the axis, a plunger wear plate disposed overlying at least a portion of the air plenum, and having an array of axially oriented openings for receiving air directed from the air plenum, a plurality of openings in the neck ring arm for receiving air from the openings in the plunger wear plate across a gap between the neck ring arm and the plunger wear plate when the neck ring arm overlies the plunger wear plate, and a plurality of air passages in the neck ring for receiving air from the neck ring arm openings.

4 Claims, 6 Drawing Sheets

NECK RING COOLING

This application is a division of application Ser. No. 10/892,677 filed Jul. 15, 2004 now issued as U.S. Pat. No. 7,296,442.

FIELD OF THE INVENTION

The present invention relates generally to glassware forming machines, and more particularly to a system for cooling a neck ring assembly in a glassware forming machine.

BACKGROUND OF THE INVENTION

Individual section glassware forming machines typically include an invert arm assembly that is oscillated or rotated approximately 180° to transfer a glass parison from a blank mold to a final blow mold in which the glassware is formed into its desired final shape. A glass gob is received in a mold cavity of a blank mold and formed into a parison that is carried by neck ring tooling on the invert arm assembly. The invert arm assembly is then inverted by rotation about a longitudinal axis to dispose the parison into the final mold. Thereafter, the invert arm is returned to its starting position adjacent to the blank mold for a subsequent cycle. Considerable heat is required to maintain the formability of the molten glass gobs as they are formed into articles of glassware, such as glass containers. Accordingly, the devices used to form the glass gobs into the glass containers must be capable of continued operation in this high heat environment.

SUMMARY OF THE INVENTION

A system for directing cooling air onto a neck ring in a glassware molding machine that includes at least one stationary blank mold station having at least one plunger cylinder with an axis and at least one neck ring arm selectively aligned with the blank mold station, and at least one neck ring carried by a neck ring arm and movable into a forming position at the blank mold station coaxially with the axis. The system includes at least one air plenum stationarily disposed at the blank mold station and having an internal cavity for receiving cooling air flowing laterally inwardly toward the axis and having at least one outlet opening adjacent to the axis, and a plunger wear plate stationarily disposed overlying at least a portion of the air plenum, and having an array of axially oriented openings for receiving air directed from the air plenum. The system further includes a plurality of openings in the neck ring arm for receiving air from the openings in the plunger wear plate across a gap between the neck ring arm and the plunger wear plate when the neck ring arm overlies the plunger wear plate, and a plurality of air passages in the neck ring for receiving air from the neck ring arm openings.

In one presently preferred implementation, the blank mold station is mounted on a hollow section box that is internally pressured with cooling air, and the system further includes an air passage from within the section box to the plenum internal cavity to provide cooling air flow from the section box to the plenum. In this manner, cooling air is immediately provided from the section box to and through the invert arm assembly and onto the neck ring tooling.

According to another aspect of the present invention, a method is provided for cooling a neck ring in a glassware forming machine that includes a section box providing a supply of cooling air, and a plunger cylinder having an axis. The method includes the steps of providing an air plenum having an internal cavity defining a flow path that extends radially toward the axis and axially to an outlet, providing an air passage adjacent to the said neck ring that is aligned with the outlet of the air plenum, and directing cooling air from the section box to the air passage so the cooling air flows radially in the air plenum toward the axis, and then axially from the outlet to the air passages to cool the neck ring.

BRIEF DESCRIPTION OF THE DRAWINGS

These and other objects, features, advantages and aspects of the present invention will be apparent from the following detailed description of the preferred embodiments and best mode, appended claims and accompanying drawings in which:

DETAILED DESCRIPTION OF THE PREFERRED EMBODIMENTS

Figure 1:
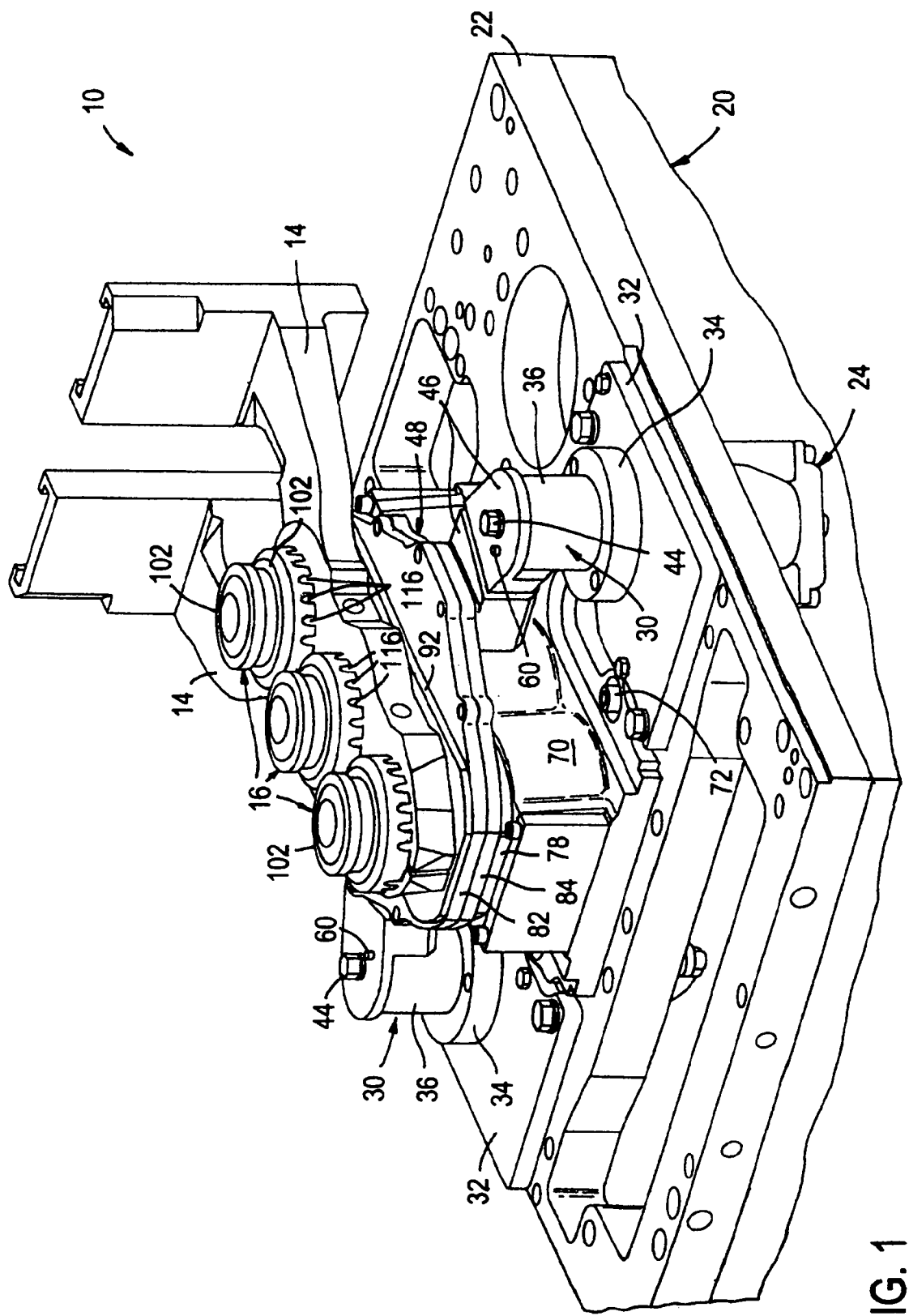
FIG. 1 is a fragmentary perspective view of a portion of an individual section glassware forming machine and an invert arm assembly with neck ring tooling according to one presently preferred embodiment of the invention.

Referring in more detail to the drawings, FIG. 1 illustrates a portion of an individual section glassware forming machine 10 including a neck ring cooling assembly 12 according to one presently preferred embodiment of the present invention. The individual section glassware forming machine 10 includes a blank mold station wherein glass gobs are received in blank mold cavities and are formed into glass parisons carried by neck rings 16 on neck ring arms 14. The neck ring arms 14 are carried by an invert arm assembly (not shown) and are driven 180° about a longitudinal axis to dispose the glass blanks carried by neck rings 16 in cavities of a final blow mold. In the final blow mold the glass blanks are blow molded into articles of glassware, such as glass containers. The articles of glassware are released from the neck rings 16 and the neck ring arms 14 are reciprocated back to their starting position adjacent to the blank mold for a subsequent cycle. An invert arm of the type suitable for use with an individual section machine is disclosed in U.S. patent application Ser. No. (OI 18070), the disclosure of which is incorporated herein by reference in its entirety. Likewise, the section boxes, blank mold and finish molds may be of generally conventional construction, with exceptions as noted herein.

The glassware forming machine includes a section box 20 of which a top plate 22 is shown in FIG. 1. The section box 20 is closed and is preferably pressurized with cooling air at a pressure of about 2-3 psi, by way of example without limitation. A valve 24 is disposed adjacent to an outlet 26 (FIG. 5) of the top plate 22 and is adapted to control the flow of cooling air therethrough. The valve 24 may be controlled by a remotely located solenoid, and may be pneumatically driven to its closed position and yieldably biased to its open position.

When closed, the valve 24 prevents cooling air flow out of the section box 20 through the outlet 26, and when open, the valve 24 permits flow of cooling air out of the outlet 26.

Figure 4:
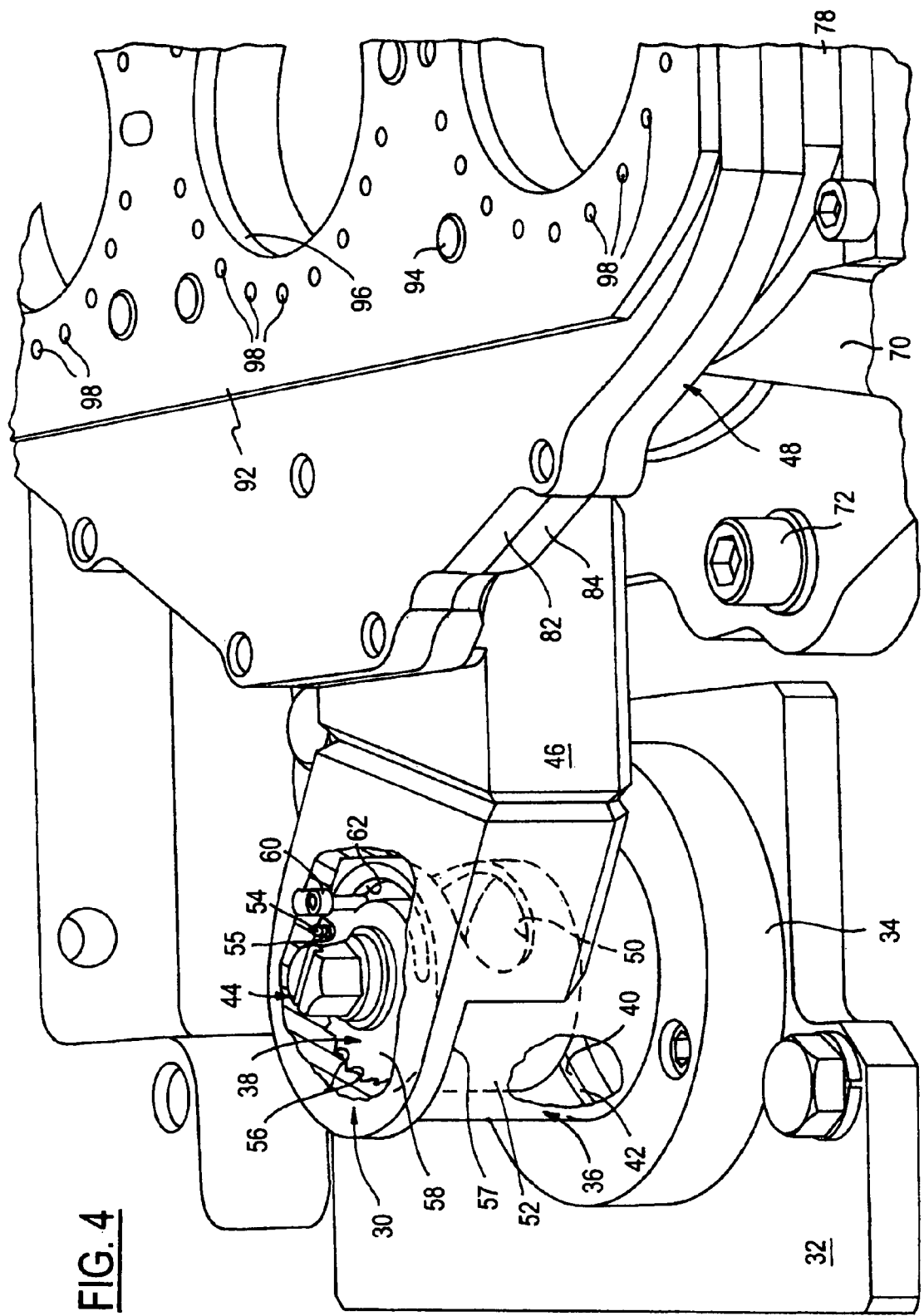
FIG. 4 is an enlarged perspective view illustrating a portion of the neck ring cooling air plenum and a damper valve assembly that is partially broken away to illustrate details of the damper valve.

A cooling air flow valve assembly, or damper valve assembly 30 is disposed downstream of the outlet 26 and is constructed and arranged to control the rate at which cooling air flows therethrough. The damper valve assembly 30 is carried on a mounting plate 32 fixed to the top plate 22 and includes an annular generally cylindrical collar 34 fixed to the mounting plate 32, a cylindrical housing 36 disposed within the collar 34, and a valve body 38 (FIGS. 4 and 5) disposed within the housing 36. The housing 36 is preferably slidably received within the collar 34 for relative axial movement of the housing 36 relative to the collar 34 and the section box top plate 22. As best shown in FIG. 4, the collar 34 preferably includes a circumferential groove 40 in its inner surface to receive an O-ring or other seal 42 between the collar 34 and housing 36 for a fluid tight seal between them. The housing 36 is connected to a laterally extending bracket or tube assembly 46 which in turn is connected to and moveable with an air plenum 48, as will be set forth in more detail.

The valve body 38 is received for rotation within the housing 36 on an integral shaft and a bolt 44, and is axially supported by a retaining ring 45 in the housing 36. The valve body 38 is preferably a hollow cylinder having a circumferentially and axially extending opening 50 formed through its side wall 52 defining a portion of the flow path of the cooling air from the section box to the neck rings 16. A detent ball 54 may be carried by the valve body 38 along with a compression spring 55 that forces the detent ball 54 into one or more holes or detents 56 formed in an inner surface 57 of the tube assembly 46 to releasably retain the valve body 38 in one of a plurality of positions. The maximum rotation of the valve body 38 can be controlled with a screw 60 disposed within a circumferentially extending slot 62 in an upper surface 58 of the valve body 38 such that engagement of the screw 60 with the ends of the slot 62 limits the rotation of the valve body 38.

The opening 50 in the valve body 38 is selectively and variably aligned with an opening 63 (FIG. 5) in the housing 36 that is communicated with a passage 64 formed in the tube assembly 46. Preferably, the valve body 38 can be rotated so that the opening 50 is completely out of alignment with the passage 64, thereby preventing or at least substantially restricting cooling air flow into the passage 64 when desired. The valve body 38 can also be manually rotated to various positions as preferably determined by the detent arrangement to vary and adjust the flow area of the opening 50 that is aligned with the passage 64 to thereby vary the flow rate through the valve 38 and into the passage 64.

The tube assembly 46 preferably extends outwardly from and may be part of the air plenum 48 that is stationary and carried on a plunger cylinder housing 70 mounted on the section top plate 22 such as by a plurality of machine screws 72. The plunger cylinder housing 70 includes, in the embodiment shown, three generally cylindrical cavities 74 that define at least in part three separate plunger cylinders 76 each adapted to receive a plunger in a press-and-blow type individual section glassware forming machine. Each plunger cylinder 76 has an axis that is parallel with an axis of the blank mold station. A plunger cylinder cap 78 may be disposed on the plunger cylinder housing 70 and preferably includes an annular and generally cylindrical skirt 80 for each plunger cylinder 76 so that the cap 78 defines part of the plunger cylinders 76. The height of the damper valve housing 36 is changed when the plunger cylinder height is changed which raises or lowers the air plenum 48 that is attached to them. To accommodate such variation in the axial height of the tube assembly 46, the damper valve housing 36 is slidably received within the collar 34 with an airtight seal provided by the seal 42 between them in all positions of the damper valve housing 36.

Figure 2:
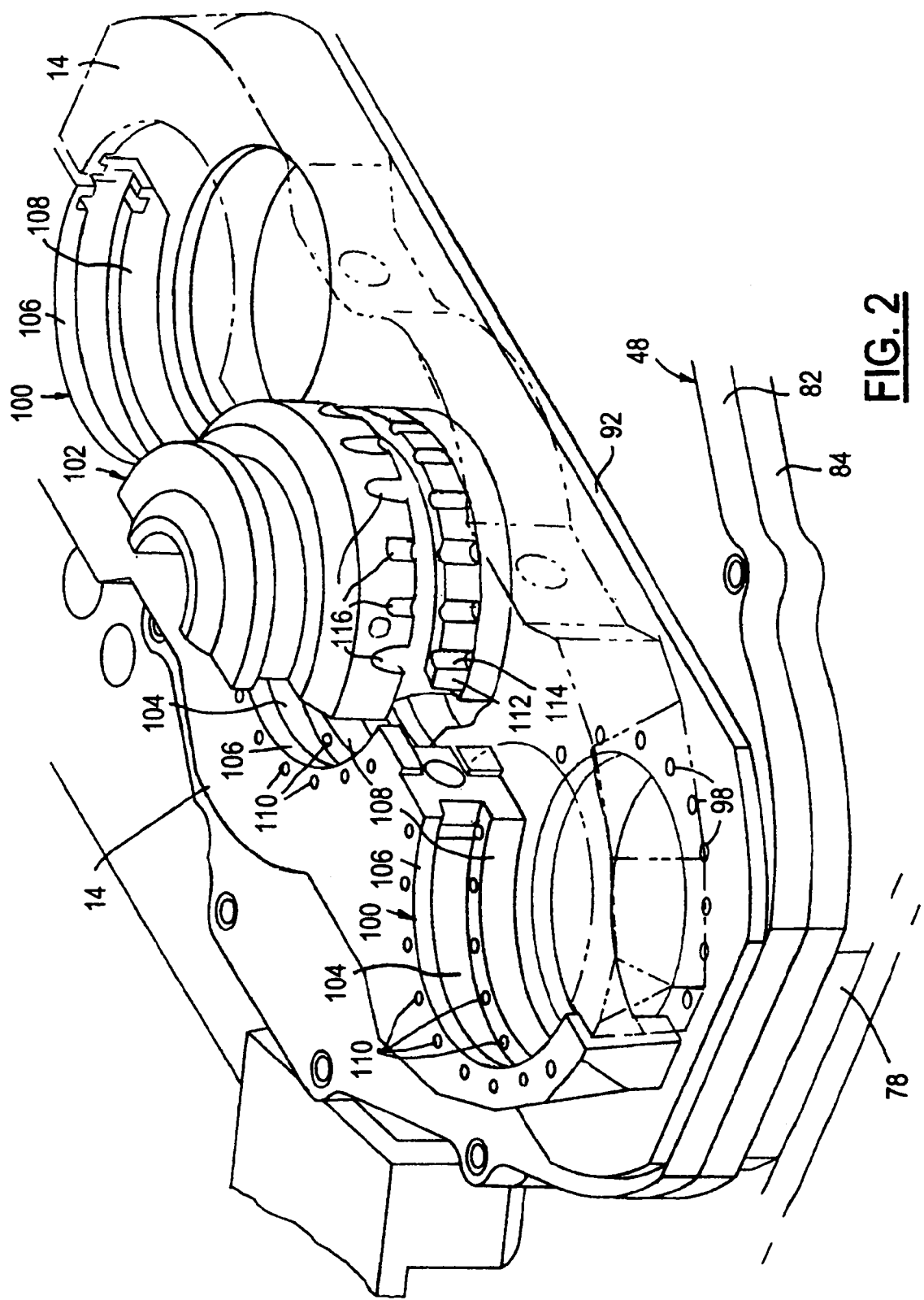
FIG. 2 is an enlarged fragmentary perspective view illustrating the invert arm assembly of FIG. 1 with some of the neck ring tooling removed.
Figure 3:
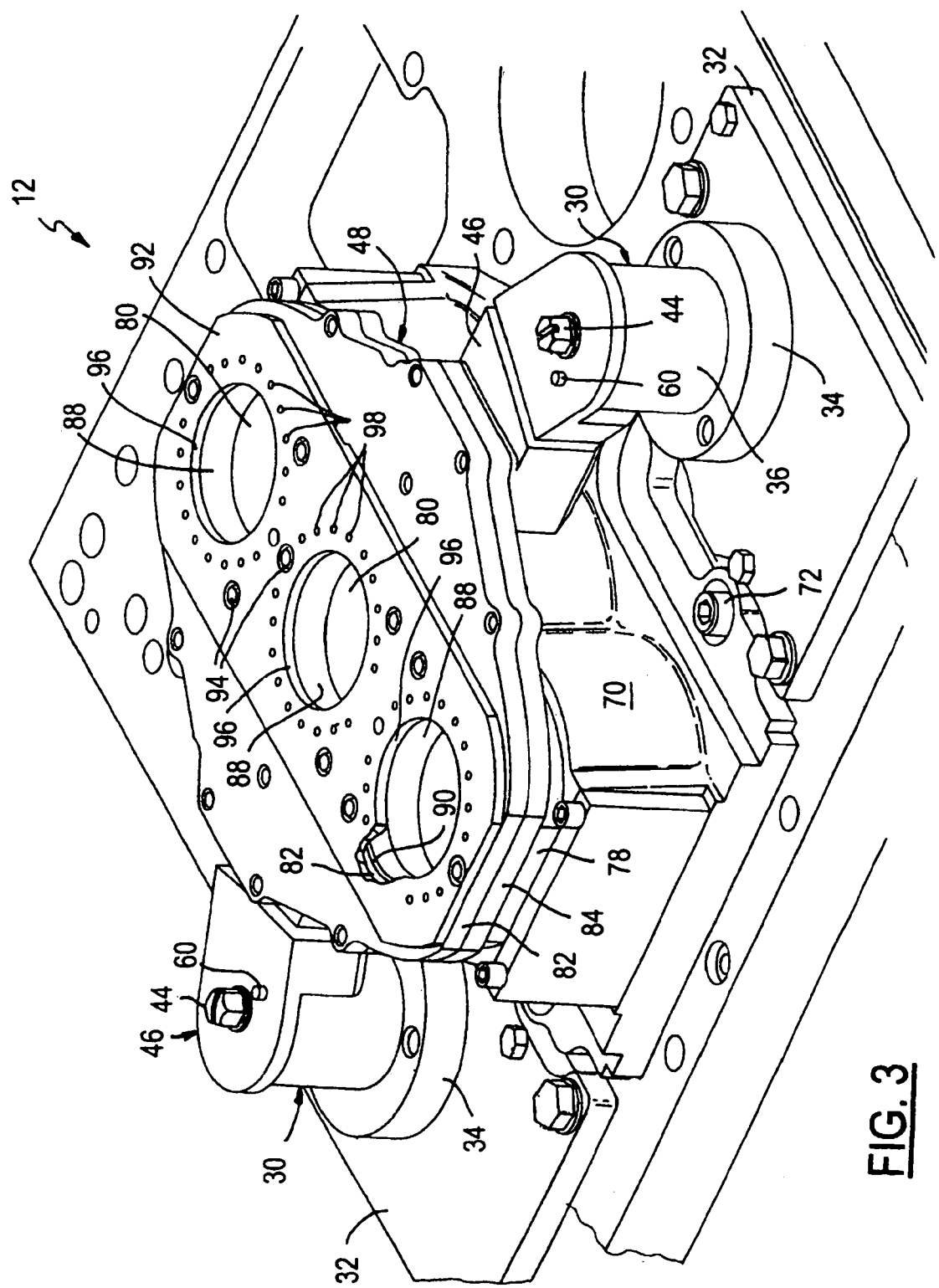
FIG. 3 is a fragmentary perspective view of a section box top plate and neck ring cooling air plenum assembly.

At its other end, the passage 64 in the tube assembly 46 communicates with the air plenum 48. The air plenum 48 preferably includes a pair of plates 82, 84 mated together with a passage or internal cavity 86 defined between them to permit air flow from the tube assembly 46 and into the cavity 86. At least one of the plates 82, 84 includes a plurality of generally cylindrical holes 88 coaxially aligned with the plunger cavities 74 and defining in part the plunger cylinders 76. As best shown in FIG. 2, an upper plate 82 of the air plenum 48 preferably includes a plurality of arcuate slots that define outlet openings 90 adjacent to and spaced radially outwardly from the holes 88 each communicating with the air cavity 86 to permit cooling air flow therethrough. Accordingly, the outlet openings 90 are adjacent to the axis of their respective plunger cylinders 76.

A plunger wear plate 92 is disposed on the upper plate 82 of the air plenum 48 and in use is adjacent to the neck ring arms 14 when the neck ring arms 14 are at the blank mold side of the individual section glassware forming machine 10. The plunger wear plate 92 may be stationarily connected to the air plenum 48 by a plurality of machine screws 94. The plunger wear plate 92 preferably includes a plurality of openings 96, with each opening 96 coaxially aligned with a separate one of the plunger cavities 74 and defining in part a plunger cylinder 76. An array of axially oriented openings 98 in the plunger wear plate 92 are provided spaced radially outwardly from each opening 96 and circumferentially spaced from each other with each opening 98 being aligned with a respective one of the outlet openings 90 in the air plenum 48 to permit air flow from the air plenum 48 through the plunger plate openings 98.

As best shown in FIG. 2, the neck ring arms 14 are preferably mirror images of each other with each including a plurality of arcuate recesses 100 that when the arms are closed together, define a plurality of circular openings that are preferably coaxially aligned with the plunger cylinders 76. A plurality of sets of neck rings 16 are carried by the arms with each set of tooling including two neck ring halves 102. One neck ring half 102 of each set is carried by a separate one of the neck ring arms 14 so that when the neck ring arms 14 are brought together, the neck rings 16 are moved to a closed position with the halves 102 of each set of neck rings 16 being closed together. The neck ring arms 14 are also moveable away from each other to separate the halves 102 of the neck rings 16 and to release the neck rings 16 from a finish of a molded glassware article.

As best shown in FIG. 2, each neck ring arm 16 includes a radially inwardly extending arcuate channel 104 in which a portion of the neck rings 16 is received to facilitate mounting and locating the neck rings 16 on the neck ring arms 14. The channel 104 defines in part, upper and lower rims 106, 108, respectively, through which a plurality of aligned openings or bores 110 extend with each bore 110 opening into the channel 104 and being circumferentially spaced from adjacent bores 110. Additionally, each bore 110 is preferably aligned with a through bore 98 in the plunger wear plate 92 to receive air that passes through the plunger wear plate 92 and across a gap between the plunger wear plate 92 and the neck ring arms 14 when the neck ring arms 14 are disposed over the plunger wear plate 92.

Each half 102 of each set of the neck rings 16 includes a radially outwardly extending flange 112 disposed in the recess 104 of an neck ring arm 14. Axially extending slots 114 formed in the flange 112 each define part of a plurality air passages 115 that permit air flow between the neck ring arm 14 and neck rings 16. The neck rings 16 preferably also include a plurality of slots 116 or cavities extending above the neck ring arms 14 that also define part of the air passage and through which air that passes through the neck ring arms 14 is discharged to the atmosphere. The upper slots 116 or cavities are preferably angled or tapered radially outwardly to direct the air flow away from the finish of containers or blank molds carried by the neck rings 16 to prevent premature cooling of the blank molds or containers. Otherwise, the neck ring arms 14 or neck rings 16 can be of substantially conventional construction including a central bore coaxially aligned with the plunger cylinders when the neck ring tooling is in position to form and hold the finish of the articles of glassware.

Figure 5:
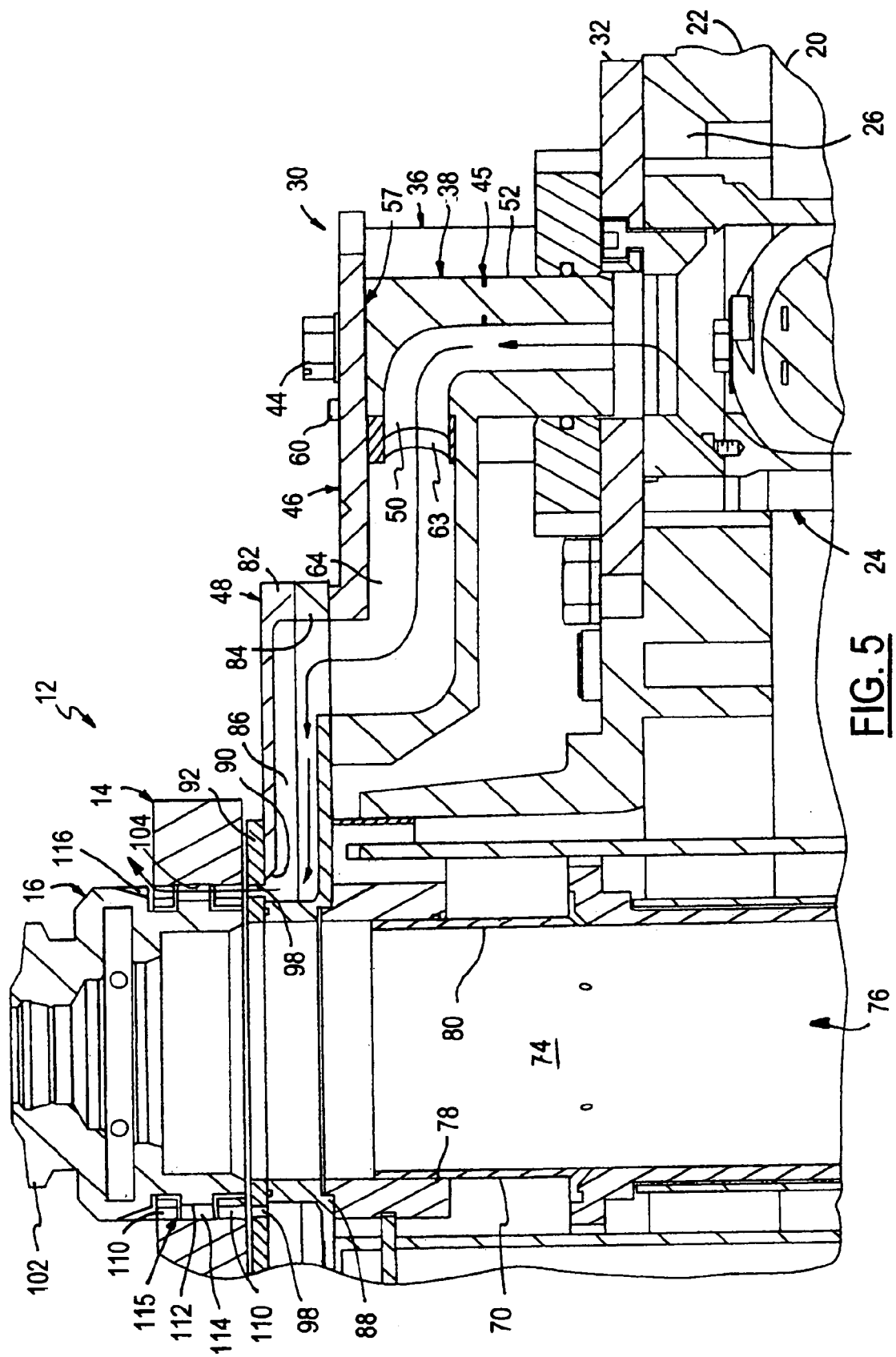
FIG. 5 is a fragmentary sectional view of a portion of the neck ring cooling air plenum illustrating a path of air flow therethrough.
Figure 6:
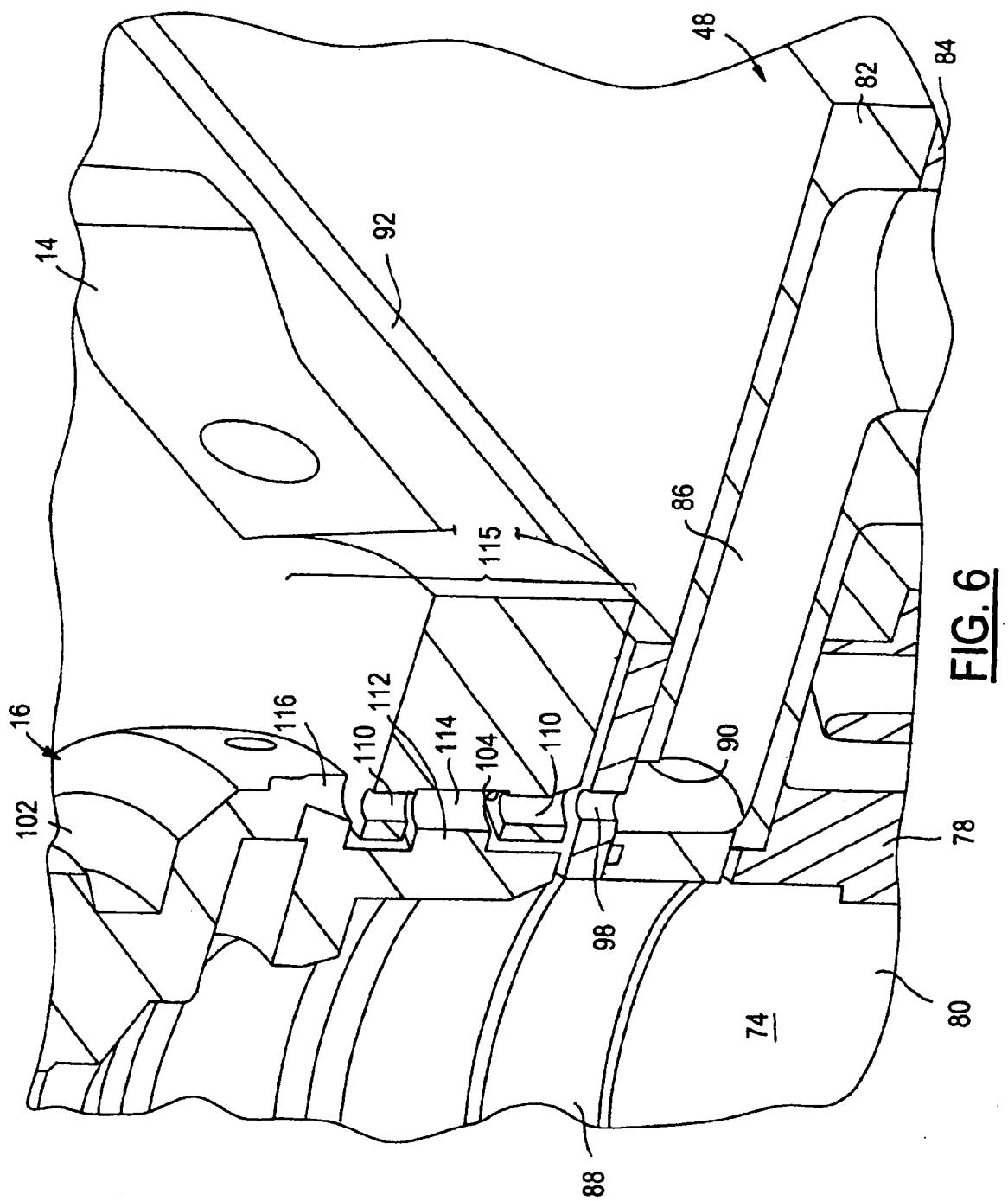
FIG. 6 is a fragmentary perspective sectional view of a portion of the neck ring cooling air plenum.

Accordingly, as best shown in FIGS. 5 and 6, cooling air flows from the pressurized section box 20, upward or axially through the flow control valve 24, axially into and radially out of the damper valve 30 toward the axis, radially into and axially out of the passage 64 in the tube assembly 46, axially into, radially within toward the axis of the plunger cylinders, and axially out of the air plenum 48, and axially into and through the plunger wear plate 92 and into the neck ring arms 14. In the neck ring arms 14, the cooling air is passed axially through the bores 110 in the neck ring arms 14 and the slots 114, 116 in the neck rings 16 to cool them in use. Desirably, the cooling air flow path from the section box 20 to the neck ring arms 14 and neck rings 16 is separate from the cooling system used to cool the blank molds or other components of the individual section glassware forming machine 10. Accordingly, the neck rings 16 and neck ring arms 14 can be cooled as desired without regard to the cooling of other components of the individual section glassware forming machine 10.

While certain preferred embodiments, constructions and arrangements of the neck ring cooling system have been shown and described herein, one of ordinary skill in this art will readily understand that modifications and substitutions can be made without departing from the spirit and scope of the invention as defined by the appended claims.

The invention claimed is:

1. A method of cooling a neck ring in a glassware forming machine including a section box providing a supply of cooling air, and a plunger cylinder having an axis, including the steps of:
   providing a neck ring arm to carry said neck ring;
   providing an air plenum having an internal cavity defining a flow path that extends radially toward said axis and axially to an outlet;
   providing a plunger wear plate stationarily disposed overlying at least a portion of said air plenum, and having an axially oriented opening for receiving air directed from said air plenum;
   providing an air passage adjacent to said neck ring, said air passage being aligned with the outlet of the air plenum and being defined at least in part by an opening in said neck ring arm for receiving air from said axially oriented opening in said plunger wear plate across a gap between said neck ring arm and said plunger wear plate when said neck ring arm overlies said plunger wear plate; and
   directing cooling air from said section box to said air passage so said cooling air flows radially in said air plenum toward said axis, and then axially from said outlet to said air passage including the neck ring arm opening to cool the neck ring and at least a portion of said neck ring arm.

2. The method of claim 1 which also includes the step of providing a damper valve between the section box and the air plenum, said damper valve including an adjustable outlet to control the rate of cooling air flow to the air plenum.

3. The method of claim 1 wherein said air plenum is adjustably carried on said section box and which also includes the step of adjusting the position of the air plenum relative to the section box.

4. The method of claim 3 which also includes providing a seal in the flow path between the air plenum and the section box that maintains a fluid-tight seal of the flow path between the section box and the air plenum in all positions of the air plenum.

* * * * *